Patented Feb. 15, 1949

2,461,701

UNITED STATES PATENT OFFICE 2,461,701

CONVERSION OF ALPHA AMINO ACIDS TO ALPHA HYDROXY ACIDS

Paul R. Shildneck, Decatur, Ill., assignor to A. E. Staley Manufacturing Company, a corporation of Delaware No Drawing. Application May 4, 1945, Serial No. 592,083

7 Claims. (Cl. 260—521)

1

The present invention relates to improvements in the conversion of alpha amino carboxylic acids of the aliphatic series to the corresponding alpha hydroxy acids by reacting the former with nitrous acid in a novel manner.

Replacement of an amino group with the hydroxyl group by means of nitrous acid, in which process the nitrogen of the replaced amino group is eliminated as elementary nitrogen, is a well-known chemical reaction. This reaction is the basis of the popular Van Slyke determination of amino nitrogen in hydrolytic products of proteins and in other organic compounds. The determination involves reacting the amino compound with a large excess of acetic acid and concentrated aqueous sodium nitrite solution at room temperature. The reaction has also been used to prepare alpha hydroxy aliphatic carboxylic acids from the corresponding alpha amino acids, but it has not been regarded as a particularly useful reaction for this purpose because the yield of hydroxy acid, based on the nitrous acid used, is low when the conventional reaction conditions are employed.

Generally, it is an object of the present invention to improve the known process of preparing alpha hydroxy aliphatic carboxylic acids from the corresponding alpha amino acids by reacting the latter with nitrous acid, whereby higher yields of the hydroxy acid, based on the nitrous acid used, are obtained in less time than formerly and in a more economical and facile manner.

More specifically, it is an object of the invention to conduct such reactions at much higher temperatures than has hitherto been thought possible for accomplishing such results as contemplated by the present invention, and by adding the nitrous acid, or its equivalent, such as sodium nitrite, or nitrous anhydride, to a solution of the amino acid at such a rate that practically all of the nitrous acid is consumed as rapidly as it is added.

Other objects of the invention will in part be obvious and will in part appear hereinafter.

It has previously been proposed to convert alpha amino aliphatic carboxylic acids to the corresponding alpha hydroxy acids by mixing an aqueous solution of a salt of nitrous acid, such as sodium nitrite, with a solution of the amino acid in dilute aqueous mineral acid and allowing the mixed solutions to stand at room temperature, or at a lower temperature, until the evolution of nitrogen has ceased. In this connection it has been customary to use a substantial excess of nitrous acid, e. g., as much as 1.5 to 2.0 mols of

2 sodium nitrite per mol of amino acid and to allow the reaction solution to stand several hours. Even under these conditions, the yield of hydroxy acid is far below the theoretical yield, usually being in the neighborhood of 70 to 80% of theory. If the excess nitrite is not used, the yield of hydroxy acid is usually less than 70% of theory.

In accordance with the principles of the present invention, yields of alpha hydroxy aliphatic carboxylic acids as high as 96% of the theoretical yield can be obtained in a fraction of an hour from the corresponding amino acids by treating the latter with an equivalent of nitrous acid, i. e., one mol of nitrous acid per mol of amino acid. By obtaining this high yield of product from less nitrous acid than was formerly used, and by shortening the reaction time, the present invention has markedly reduced the cost of preparing these hydroxy acids from the analogous amino acids. Since about twenty different alpha amino aliphatic carboxylic acids are readily obtained from proteins by hydrolysis, the present invention makes possible the feasible commercial production of many valuable compounds from such industrial high-protein by-products as corn gluten, soybean meal, and cottonseed meal. Examples of the potential fields of application of the compounds thus produced, either as the free acid, or its salt, or as a derivative such as the ester or ether, are solvents, plasticizers, intermediates in the preparation of other organic compounds, assistants in the printing, dyeing, and finishing of textiles, flavoring materials, and perfumes.

Preferably, the reaction is carried out at a temperature just a few degrees below the boiling point of the reaction solution at normal atmospheric pressure, i. e., in the neighborhood of 95 to 100° C. Boiling the reaction solution is not recommended because it promotes removal of nitrous acid from the solution before it has reacted with the amino acid. The product yield decreases with decreasing temperature below about 95° C.; preferably, the temperature should not be below 70° C. as indicated in the table which appears hereinafter. There is no critical upper limit to the reaction temperature in my improved process, except the decomposition temperatures of the reactants. The use of reaction temperatures above 100° C. will reduce the reaction time somewhat, but that advantage is at least partially offset by the necessity of providing equipment that will withstand considerable internal pressure. In case the process is conducted at high altitudes, it may be necessary to employ pressure equipment in order to obtain the required temeprature in the reaction solution.

It is not essential to the successful operation of my process that a salt of nitrous acid be used to supply the necessary nitrous acid. Nitrous anhydride ($N_2O_3$) or an equimolecular mixture of nitric oxide (NO) and nitrogen dioxide ($NO_2$) will serve equally well. Free nitrous acid exists only in dilute solution at low temperatures; it is not recommended that it be used as such in the reaction.

Since nitrous acid rapidly breaks down to a gaseous mixture of nitric oxide and nitrogen dioxide at 75° C. and higher temperatures, and since these gases are insoluble in the hot reaction solution, it is essential, for efficient utilization of the nitrous acid, that there be provided good contact between the nitrogen oxide gases and the amino acid solution. This can be done, for example, by vigorously stirring the amino acid solution while adding the solution of the nitrous acid salt, or by introducing the salt solution, or nitrous anhydride, at the bottom of a relatively deep solution of the amino acid. Preferably, a combination of stirring and bottom introduction of the nitrous acid material should be practiced.

If a salt of nitrous acid is used in the reaction, it will be necessary to have present in the reaction solution, or to add concurrently thereto, at least an equivalent quantity of an acid strong enough to liberate nitrous acid from its salt. Sulfuric acid is preferred for this purpose because of its low cost. Other acids, either organic or inorganic, such as acetic, formic, levulinic, hydrochloric, nitric, and perchloric, can be used in place of sulfuric acid.

The concentration of amino acid in the reaction solution can vary over a wide range of values without reducing the yield of hydroxy acid unless there is present also a substantial concentration of halogen ion, which occurs, for example, when an inorganic halogen acid is used to liberate nitrous acid from its salt. If inorganic halogen acid and amino acid are present in equivalent concentration, and the inorganic acid is hydrochloric acid, that concentration should not exceed 0.5 molar, otherwise considerable replacement of amino group with halogen occurs. Preferably, the concentrations of amino acid and halogen ion, when the latter is present in the reaction solution, should be in the neighborhood of 0.2 to 0.3 molar if appreciable formation of alpha halogen organic acid is to be avoided.

Addition of the nitrous acid, or its equivalent, to the amino acid solution at a controlled rate is an important feature of the present invention. The addition rate is so controlled that the nitrous acid is practically all consumed as rapidly as it is added. In other words, there should be present at no time during the reaction more than a slight concentration of nitrous acid or its equivalent. Control of the addition rate can be exercised by properly observing the gases issuing from the reaction vessel into the air. The gases should be colorless. In the presence of the air or oxygen, a brown, or reddish brown, color of the gases indicates that nitrogen dioxide is escaping from the reaction solution, which in turn means that the nitrous acid material is being added too rapidly. Such controlled addition prevents escape of unreacted nitrous acid from the reaction solution. It also prevents oxidative degradation of the alpha hydroxy acids by the nitrous acid. Obviously, there are many standard tests for determining the presence of nitrogen dioxide, which could be used.

If the reaction is conducted at about 95° C. in a spherical reaction vessel about half full of a molar solution of amino acid, and a fine stream of a concentrated solution of sodium nitrite is introduced at the bottom of the well-stirred amino acid solution, satisfactory addition of the nitrite solution can be completed within about 30 minutes.

Application of the principles of the present invention is not restricted to optically active amino acids, such as those usually obtained by the hydrolysis of proteins. They apply equally well to optically inactive amino acids and to mixtures of optically active and inactive acids.

The following examples are illustrative embodiments of my invention.

*Example 1*

Conversion of l-leucine to l-leucic acid.—A solution of 65.5 grams of l-leucine (0.5 mol) in 1000 ml. of 0.5 normal sulfuric acid, continuously stirred and maintained at a temperature of about 95° C. in a 2000 ml. round bottomed glass flask, was treated with a solution of 35 grams of sodium nitrite (0.508 mol) in 250 ml. of water, the nitrite solution being introduced at a uniform rate over a period of 30 minutes through a small bore appropriately curved inlet tube leading to the bottom of the reaction flask. After all the nitrite solution was added, and the evolution of gas had ceased, the reaction solution was evaporated under reduced pressure to about 300 ml., cooled, and extracted continuously with ethyl ether for 24 hours. The ether extract was dried over anhydrous magnesium carbonate, separated from the drying agent, decolorized with 5 grams of activated vegetable carbon, separated from the carbon, and evaporated to dryness in a tarred dish over a steam bath. On cooling, the ether-free liquid residue, weighing 63 grams, turned to a soft crystalline mass having an observed melting point of 77 to 80° C. and a neutral equivalent of 130. The neutral equivalent of leucic acid is 132, and the reported melting point of the leavo acid is 80 to 81° C. The product yield was 95% of theory.

*Example 2*

Conversion of d-glutamic acid to the lactone of alpha hydroxy glutaric acid.—Substitution of 73.5 grams of d-glutamic acid (0.5 mol) for leucine in Example 1 yielded 62 grams of a viscous light colored liquid with a neutral equivalent of 128. The neutral equivalent of the lactone of alpha hyroxy glutaric acid is 130. The product yield was 96% of the theoretical yield of lactone. The initially-formed alpha hydroxy glutaric acid readily loses water under the reaction conditions of this example, and is thus converted into its lactone.

*Example 3*

Conversion of l-phenylalanine to l-beta phenyl lactic acid. — Substitution of 82 grams of l-phenylalanine (0.5 mol) for the leucine in Example 1 gave 78 grams of a solid crystalline material with an observed melting point of 121 to 124° C. and a neutral equivalent of 161. The neutral equivalent of beta phenyl lactic acid is 163, and the reported melting point of the levo acid is 124 to 125° C. The yield of product amounted to 96% of that theoretically possible.

Example 4

*Preparation of hydroxy acids from hydrolyzed zein.*—One hundred grams of dry zein was completely hydrolyzed by boiling it under reflux for 72 hours with a solution of 230 grams of sulfuric acid in 620 ml. of water. Humin was filtered from the cooled hydrolyzate and the humin filter cake was washed with water until the combined filtrate and washings totaled 1500 ml. The combined liquors were then mixed with a solution of 850 grams of hydrated barium hydroxide (equivalent to 410 grams of barium oxide) in 1500 ml. of hot water. After standing overnight the precipitated barium sulfate was filtered off and washed on the filter with four 500 ml. portions of hot water. The combined alkaline filtrate and washings were then evaporated to a volume of about 2 liters under reduced pressure. All ammonia was removed from the liquor during this evaporation. The ammonia-free liquor was analyzed for barium and treated with the equivalent quantity of diluted sulfuric acid. The precipitated barium sulfate was filtered off and washed on the filter with hot water to remove adhering mother liquor. The combined filtrate and washings were again evaporated under reduced pressure to a volume of about 2 liters. The zein hydrolyzate, now substantially free of ammonia and inorganic ions and containing 12.0 grams of amino nitrogen (as determined by Van Slyke analysis), was acidified with 50 grams of 96% sulfuric acid and treated according to the procedure specified in Example 1 with a solution of 68 grams of sodium nitrite in 500 ml. of water. A 15% excess of nitrite, based on the amino nitrogen, was required to eliminate substantially all of that nitrogen, presumably because of easily oxidizable substances present in the hydrolyzate. The cooled reaction solution was separated from a small proportion of insoluble tarry material, evaporated under reduced pressure to a volume of about 600 ml., and extracted continuously with ethyl ether for about 24 hours. The ether extract, after being dried over anhydrous magnesium sulfate, and treated with 5 grams of activated vegetable carbon, yielded 86 grams of a viscous red liquid upon evaporation of the ether. The neutral equivalent of the product was 131.

The pronounced increase in efficiency of utilization of nitrous acid by operation at temperatures much higher than those previously thought possible is illustrated by the data collected in the following table. The listed data were obtained from a series of runs in each of which 0.25 mol of l-leucine was converted to l-leucic acid with 0.25 mol of sodium nitrite according to the general procedure of Example 1 modified as illustrated, by way of example, in the table.

| Reaction Temperature | Reaction Time | Yield of Leucic Acid |
|---|---|---|
|  | Minutes | Percent |
| 15° C | 30 | 63 |
| 35° C | 30 | 70 |
| 55° C | 30 | 77 |
| 75° C | 30 | 85 |
| 95° C | 30 | 95 |
| 35° C | 15 | 68 |
| 35° C | 45 | 71 |
| 35° C | 135 | 70 |
| 75° C | 15 | 83 |
| 75° C | 45 | 85 |
| 75° C | 135 | 85 |

The tabulated data brings out clearly the unexpected fact that at low temperatures one mol of nitrous acid reacts rapidly with one mol of alpha amino aliphatic carboxylic acid to yield the analogous alpha hydroxy acid, and then stops abruptly, or nearly so, far short of completion. The normal expectation would be that, although the rate of reaction would be less at low than at high temperature, the reaction would continue, even at low temperature, to approach completion. But in this instance, stoichiometric production of the alpha hydroxy acid can only be obtained at elevated temperatures.

The terms "nitrous acid" and "nitrous acid or its equivalent" when coupled with the expressions "reacted with . . ." and "treated with . . .," as used hereinbefore and in the appended claims, embrace free nitrous acid, salts of nitrous acid, nitrous acid anhydride, mixtures of nitric oxide and nitrogen dioxide, and any other substance or combination of substances which, when added to the reaction solution, yield nitrous acid, its anhydride, or the equivalent mixture of nitrogen oxides.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described my invention, what I claim is:

1. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., and adding the nitrous acid to the amino acid solution at such a rate that practically all of the nitrous acid is consumed as rapidly as it is added.

2. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., and introducing the nitrous acid solution into the amino acid solution, contained in a reaction vessel, within a region beneath the surface of said solution.

3. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., and introducing the nitrous acid solution into the amino acid solution, contained in a reaction vessel, within a region near the bottom of said solution.

4. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., and stirring the amino acid solution while the nitrous acid is added to it.

5. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., introducing the nitrous acid into the amino acid solution, contained in a reaction vessel, within a region beneath the surface of said solution; and adding the nitrous acid to said solution at such a rate that practically all of the nitrous acid is consumed as rapidly as it is added.

6. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., introducing the nitrous acid into the amino acid solutions, contained in a reaction vessel, within a region beneath the surface of said solution; and stirring said solution while the nitrous acid is added to it.

7. In the conversion of an alpha amino acid selected from the group consisting of leucine, phenylalanine and glutamic acid to the corresponding alpha hydroxy acid by reacting a solution of the former with nitrous acid, the improvement which comprises conducting the reaction at a temperature above about 70° C., introducing the nitrous acid into the amino acid solution, contained in a reaction vessel, within a region beneath the surface of said solution; adding the nitrous acid to said solution at such a rate that practically all of the nitrous acid is consumed as rapidly as it is added; and stirring said solution while the nitrous acid is added to it.

PAUL R. SHILDNECK.

REFERENCES CITED

The following references are of record in the file of this patent:

UNITED STATES PATENTS

| Number | Name | Date |
|---|---|---|
| 1,910,679 | Crawford et al. | May 23, 1933 |
| 2,229,897 | Migrdichian | Jan. 28, 1941 |
| 2,350,370 | Schopmeyer et al. | June 6, 1944 |
| 2,369,491 | Redmon et al. | Feb. 13, 1945 |

OTHER REFERENCES

Fischer et al., Liebig's Ann., vol. 340, pp. 177–179 (1905).

Sure et al., Jour. Biol. Chem., vol. 31, pages 527–532 (1917).

Gmelin et al., Beilstein "Handbuch der Org. Chem." (4th ed.), vol. III (1921), page 336.

Dunn et al., Jour. Biol. Chem., vol. 53, pages 401–410 (1922).

Taylor, J. Chem. Soc. (London), 1928, pp. 1897–1905.

Holmberg, Ber. Deut. Chem., vol. 61, pp. 1893–1905 (1928).

Mitchell et al., "Biochem of Amino Acids" (1929), ACS Monograph # 48, pp. 119–127.

Schmidt, J. Biol. Chem., vol. 82, pp. 589–594 (1929).

Taylor et al., "Sidgwick's Org. Chem. of Nitrogen" (Oxford, 1937), pages 352–354.